United States Patent
Bussey, Jr. et al.

(10) Patent No.: US 8,147,166 B2
(45) Date of Patent: *Apr. 3, 2012

(54) DRAINAGE ELEMENT WITH LAMINATED MEMBRANE MATERIAL

(75) Inventors: Harry Bussey, Jr., Marco Island, FL (US); Buddy Harry Bussey, III, Atlantic Highlands, NJ (US)

(73) Assignee: ICC Technologies, Inc., Marlboro, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 12/928,874

(22) Filed: Dec. 22, 2010

(65) Prior Publication Data

US 2011/0091282 A1    Apr. 21, 2011

Related U.S. Application Data

(63) Continuation of application No. 12/001,703, filed on Dec. 12, 2007, now abandoned, which is a continuation-in-part of application No. 11/637,534, filed on Dec. 12, 2006, now Pat. No. 7,475,477, which is a continuation-in-part of application No. 11/591,420, filed on Nov. 2, 2006.

(51) Int. Cl.
    *E02B 11/02*    (2006.01)

(52) U.S. Cl. ........................................................ 405/43
(58) Field of Classification Search ................... 405/36, 405/43
    See application file for complete search history.

(56) References Cited

U.S. PATENT DOCUMENTS

| 3,539,013 | A  | * | 11/1970 | Smith ........................ 210/242.4 |
| 7,588,391 | B2 | * | 9/2009  | Bussey et al. ................... 405/43 |
| 2004/0057797 | A1 | * | 3/2004 | Ring ............................ 405/46 |

* cited by examiner

*Primary Examiner* — John Kreck
(74) *Attorney, Agent, or Firm* — Francis C. Hand; Carella, Byrne, Cecchi

(57) ABSTRACT

A strip of membrane material is laminated to a wider strip of netting and then the longitudinal edges of the strip of netting are seamed together into a sleeve for receiving aggregate to form an elongated tubular drainage element. The laminated peripheral portion of the resultant sleeve is used as the top of the drainage element to preclude fine material from entering the drainage element. Where a membrane is used to form the sleeve, holes or slits are placed in the peripheral portion of the sleeve that is to form the bottom of the drainage element. The seaming of the overlapped longitudinal edges of the membrane is effected using glue and a nozzle that blows air under pressure onto the seam to force the edges and glue to bond together.

11 Claims, 3 Drawing Sheets

FIG. 2
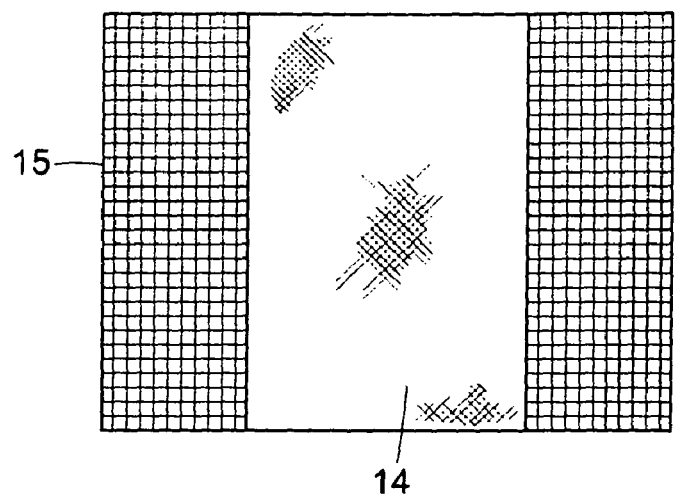
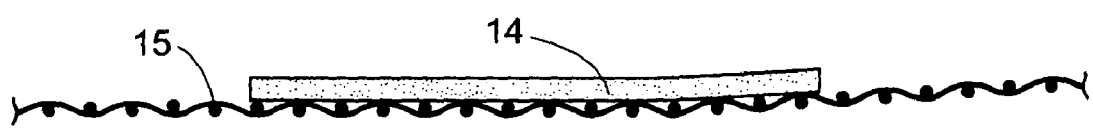
FIG. 3
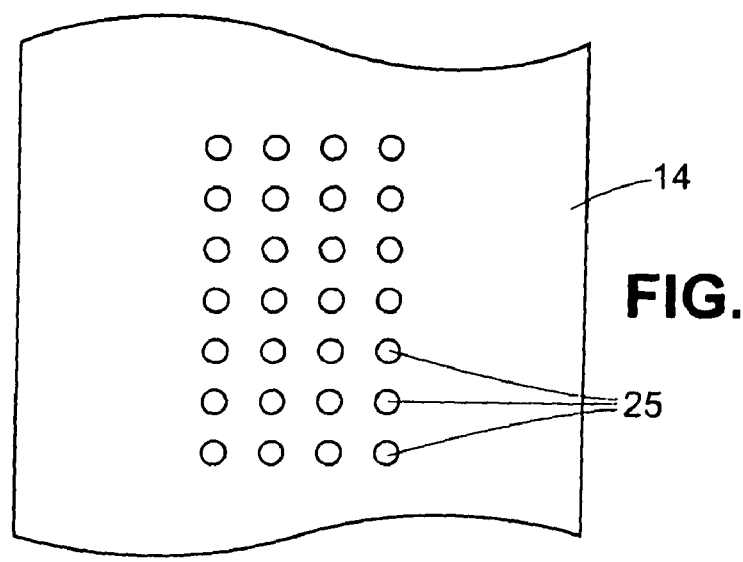
FIG. 5

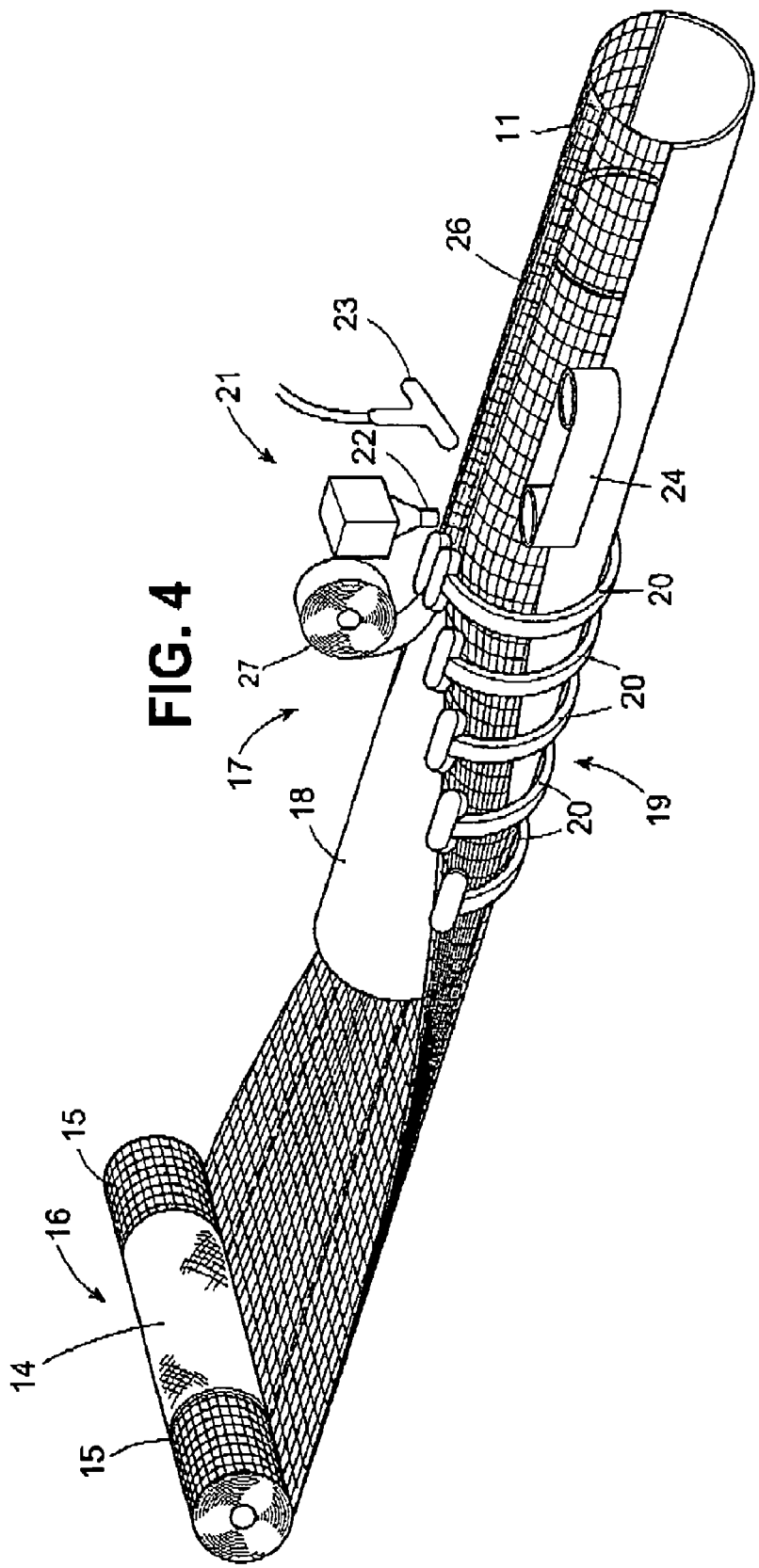

DRAINAGE ELEMENT WITH LAMINATED MEMBRANE MATERIAL

This is a Continuation of U.S. Ser. No. 12/001,703, filed Dec. 12, 2007 now abandoned which is a Continuation-in-Part of U.S. Ser. No. 11/637,634, filed Dec. 12, 2006 now U.S. Pat. No. 7,475,477 which is a Continuation-in-Part of U.S. Ser. No. 11/591,420, filed Nov. 2, 2006, the specifications of which are incorporated by reference herein.

This invention relates to a drainage element and to a method and machine for making the same. More particularly, this invention relates to method and apparatus for making drainage elements having a light weight aggregate encased in a tubular membrane.

As is known, preassembled drainage elements for use in septic systems have been constructed with a perforated pipe surrounded by a layer of synthetic aggregate and encased within a sleeve of netting. Such drainage elements are intended to avoid the need for establishing a bed of gravel upon which to rest a perforated pipe within a trench. When in use, the perforated pipe is to conduct effluent from a septic tank and to direct the effluent through perforations in the bottom sector of the pipe into the ground. Typically, after being placed in a trench, the drainage elements are covered over by a backfill.

As described in U.S. Pat. No. 6,854,924, depending on the type of fill soil, solids, such as sand or dirt, may pass downwardly through the netting into spaces between the adjacent elements of the synthetic aggregate clogging those spaces and thereby reducing the flow of effluent through the aggregate and into the ground. In order to block the infiltration of soil through the netting, this U.S. patent proposes to provide strips of barrier sheet material between the netting and the synthetic aggregate. However, the techniques described for the manufacture of such pre-assembled units are relatively cumbersome. Also, the barrier sheets are loosely held in place and may shift during transportation or placement in a trench.

Accordingly, it is an object of this invention to improve the techniques for making a preassembled drainage element with a membrane material for the filtering of fine particles of solid material from water passing into the drainage element.

It is another object of the invention to provide an improved drainage element.

Briefly, the invention is directed to a drainage element comprised of a mass of discrete aggregate defining passageways for a flow of fluid therethrough, a sleeve encasing the mass of discrete aggregate and an optional perforated pipe embedded and extending through the aggregate.

In accordance with the invention, the sleeve includes a first peripheral portion including a membrane material and a net material laminated together to form an integral two-ply layer and a second peripheral portion of net material having openings for retaining the aggregate and allowing the passage of water.

In one embodiment, the membrane material is a water-permeable filter material having a plurality of interstices characterized in being of a size for the passage of water therethrough and the filtering of fine particles of solid material from water passing through said membrane. The net material is of wider width than the membrane material and is seamed together at the longitudinal edges to form the sleeve.

In other embodiments, the membrane is a web of paper or a web of plastic film.

The longitudinal edges of the netting may be secured together in overlapping relation or in parallel upstanding relation relative to the remainder of the drainage element.

Typically, the membrane within the laminated peripheral portion of the drainage element is located at the top of the drainage element so that, when in place in a trench or the like, soil particles and the like are blocked from entering into the drainage element while water and other fluids may pass through the laminations and aggregate into the drain pipe embedded therein. The membrane extends longitudinally and over at least 45% of the periphery of the drainage element. Depending on the use of the drainage element, the membrane may extend peripherally over from 5% to 95% of the periphery of the drainage element.

In another embodiment, the drainage element comprises a mass of discrete aggregate defining passageways for a flow of fluid therethrough; and a sleeve of water-permeable filter material encasing the mass of discrete aggregate that has a longitudinally extending pattern of holes or slits in a peripheral portion thereof. The holes or slits are located in a peripheral portion of the sleeve that is to form the bottom of the drainage element when in place and constitute less than 50% of the total periphery of the sleeve.

The invention further improves on the method of making a drainage element described in the above-noted parent patent applications. In this respect, in an embodiment where a sleeve is formed from a single travelling web of material, for example, a membrane material, the two longitudinal edges of the travelling web are overlapped, a glue or adhesive is applied between the overlapped longitudinal edges at a predetermined station and a stream of air is applied under pressure onto the overlapped edges and glue to press the glue into each of the longitudinal edges to form a seam. This technique avoids a need to precisely align a mechanical pressing means, such as a roller, with the overlapped edges of the material and avoids the build up of glue on a pressing roller.

After formation of the sleeve, the forward end of the sleeve is closed and a synthetic light weight aggregate is fed into the sleeve.

This same technique of forming a seam may also be employed where the longitudinal edges of two or more travelling webs of different materials, e.g. membranes of water-permeable filter material, netting, paper, and the like are seamed together and thereafter seamed into a sleeve.

In order to provide for a flow of pressurized air to form a seam in the sleeve, use is made of a nozzle for applying a stream of air under pressure onto the overlapped edges and glue to press the glue into each of the longitudinal edges to secure the overlapped edges of the strip together.

These and other objects and advantages of the invention will become more apparent from the following detailed description taken in conjunction with the accompanying drawings wherein:

FIG. 2 illustrates a sectional view of a laminated web for making the sleeve of the drainage element of FIG. 1;

FIG. 3 illustrates a cross-sectional view of the laminated web of FIG. 2;

FIG. 4 illustrates a schematic view of a part of an apparatus for making the drainage element of FIG. 1;

FIG. 5 illustrates a sectional view of a membrane used to make a sleeve for a drainage element with a pattern of holes in accordance with the invention.

Figure 1:
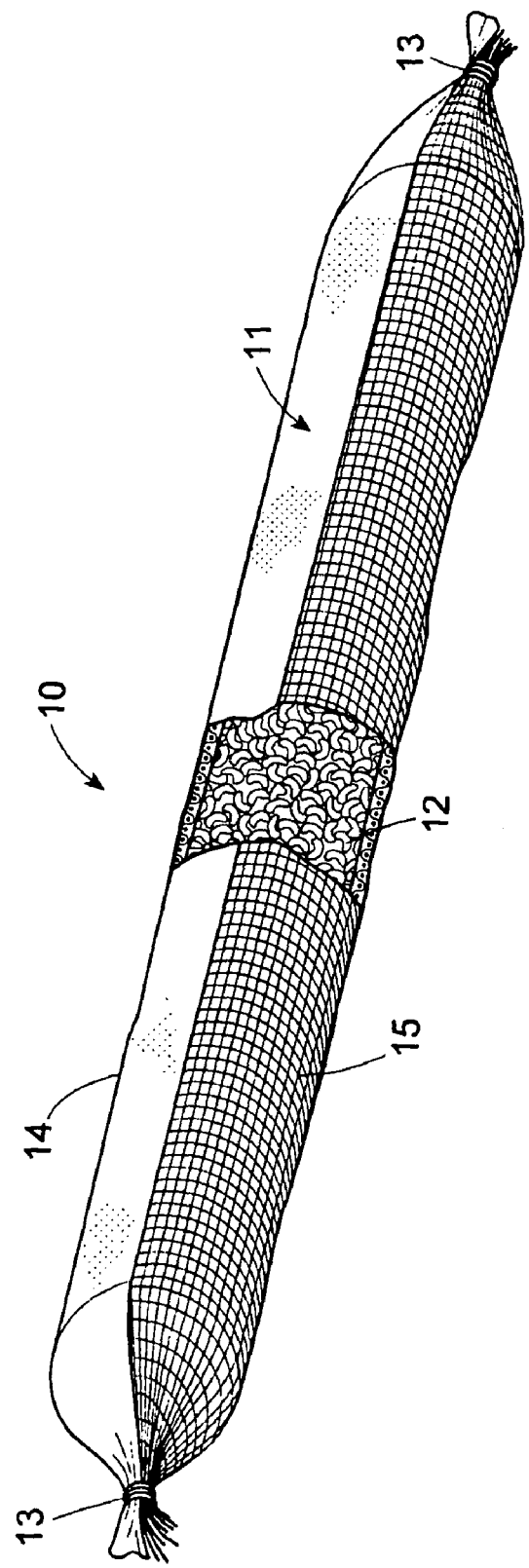
FIG. 1 illustrates a perspective view of a drainage element in accordance with the invention.

Referring to FIG. 1, the drainage element 10 is comprised of a tubular sleeve 11 and a mass of aggregate 12 made of an expanded thermoplastic material within the sleeve 11. The aggregate 11 is made of discrete elements of a size to define passageways for a flow of fluid therethrough.

The tubular sleeve 11 encases the mass of discrete aggregate 12 and is gathered together at each end with tie means 13, for example in the form of ties, closing around each gathered end of the sleeve 11 to retain the aggregate therein.

The drainage element 10 may have a pipe extending completely therethrough, may have a pipe extending from one end only or no pipe at all.

Referring to FIGS. 1 to 3, the sleeve 11 has a first peripheral portion at the top of a laminated construction being formed of a longitudinal web of a membrane material 14 and a longitudinal web of net material 15. The net material 15 is of wider width than the membrane material 14 and is seamed together at the longitudinal edges to form the sleeve 11. The net material forms a remaining second peripheral portion having openings for retaining the aggregate and allowing the passage of water.

The characteristics of the membrane material 14 are such that the membrane is tear resistant. Hence, there is a reduced risk of netting being torn apart by catching on equipment in the field and spilling of the aggregate 12 out of the drainage element 10. Further, the membrane 14 is water-permeable and has a plurality of interstices characterized in being of a size for the passage of water therethrough and the filtering of fine particles of solid material from the water passing through the membrane 14.

The membrane 14 is made of a spun bonded polyester material as described in the above-noted parent applications.

The longitudinal webs of material 14, 15 are laminated together throughout in any suitable fashion to form an integral two-ply layer.

Due to the tear-resistant nature of the membrane 14, the two-ply layer is relatively strong. Further, the membrane 14 reduces any distortion of the net material 15 of the two-ply layer during formation into the sleeve 11 and the removal of the sleeve 11 from the forming apparatus 17 described below. Still further, the formation of an integral two-ply layer precludes the membrane 14 from shifting within the drainage element during transportation and handling.

In one case, the two webs of material 14, 15 are laminated together and wound up in a single roll 16 to be supplied to the sleeve forming apparatus 17 as illustrated in FIG. 4 and as described in parent application U.S. Ser. No. 11/637,534. In another case, after being laminated together, the resulting laminated web may be fed directly to the sleeve forming apparatus. The two-ply nature of the laminated web allows for easy handling during the fabrication of the drainage unit 10.

The web of membrane material 14 is centrally located on the web of netting 15 in order to form the top of the drainage element 10 when in place, for example, in a drainage ditch or trench. In this respect, the web of membrane material extends longitudinally and over at least 45% of the periphery of the drainage element 10. The sleeve 11 may be formed with the web of membrane 14 positioned to the outside of the sleeve 11 or to the inside of the sleeve 11, i.e. on top of the net material 15, as illustrated in FIG. 1, or under the net material 15.

Referring to FIG. 4, an apparatus 17 for forming the drainage element 10 includes a supply station having means (not shown) to support a roll 16 of the laminated construction of membrane 14 and netting 15 for delivery to a tube 18 disposed on a horizontal axis. As indicated, a forming means 19 in the form of a plurality of longitudinally spaced pairs of guide plates 20 are angularly disposed about the tube 18 in a progressive pattern. Each pair of guide plates 20 serves to guide the delivered web 14, 15 about the tube 18 in order to progressively bring the longitudinal edges of the web of netting 15 into overlapping relation.

The apparatus 17 also includes a securing means 21 for securing the overlapped edges of the netting 15 together to form the sleeve 11 about the tube 18. This securing means 21 includes a valve 22 for expelling a glue or adhesive between the overlapped edges as well as a nozzle 23 for applying a stream of air under pressure onto the overlapped edges and glue to press the glue into each of the longitudinal edges to secure the overlapped edges of the netting 15 together to form a strong seam.

The use of the nozzle 23 to deliver compressed air to form the seam eliminates need for a cooling means for cooling the glue after application.

Alternatively, a narrow strip of netting 26 with a finer mesh than the netting 15 may be positioned above or below or both above and below the overlapped edges of the netting 15 prior to application of the glue or adhesive so that the glue or adhesive permeates through the four layers of netting to form a strong seam upon solidifying. For example, as shown in FIG. 4, the strip of netting 26 may be delivered from a roll 27 and placed on top of and overlapping the overlapped edges of the netting 15 prior to application of the glue or adhesive.

As illustrated, a puller or capstan arrangement 24 is provided for moving the sleeve 11 from the tube 18.

The remainder of the apparatus is as described in above-noted copending parent patent application that is incorporated by reference herein.

Typically, the laminated peripheral portion of the drainage element 10 extends longitudinally and over at least 45% of the periphery of the drainage element. This allows the laminated peripheral portion to be located at the top of the drainage element so that when in place in a trench or the like, the soil particles and the like are blocked from entering into the drainage element while water and other fluids may pass through the laminations and aggregate into the drain pipe embedded therein.

The drainage element 10 is to be arranged in a trench, ditch, or the like so that the membrane material 14 is at the top of the element while the net material 15 is at the bottom so that the bottom of the element 10 has the larger openings. In this arrangement, soil will not infiltrate into the drainage element 10 from above. On the other hand, water may pass through the membrane material. Further, in the event that larger particles do pass into the drainage element 10, for example, in a septic field, these particles may easily flow through the net material 15 at the bottom.

The drainage element 10 may also be made wherein the membrane material 14 is a web of paper or a web of plastic film laminated to a web of netting 15. In these embodiments, the paper or plastic film serves as a barrier to the infiltration of soil and large particles into the drainage element 10.

The apparatus 17 may be used to form a sleeve from a roll of the membrane material 14 per se, e.g. a water-permeable filter material. In this case, the overlapping longitudinal edges of the membrane material 14 would be glued together under the stream of compressed air to form a seam.

Referring to FIG. 5, where the sleeve 11 is made entirely of the membrane material 14, a longitudinally extending pattern of rows of holes 25 or slits (not shown) is formed in a portion of the web that is to form the bottom of the drainage element 10 when in place, particularly in a septic system, and that constitutes less than 50% of the total periphery of the resultant sleeve 11. These holes 25 may be formed in any suitable manner, for example, by a plurality of pins, each of which has a sharp point for penetrating between the fibers of the spun bonded polyester material and a shank of cylindrical cross-section that tapers outwardly and longitudinally from the sharp point to pass through the membrane material to spread apart the spun bonded polyester material to form a hole 25 without cutting or rupturing the polyester material. The action of the pins spreads the fibers of the polyester material to the outside perimeter of the holes making the perimeter of the holes stronger.

Alternatively, the pins for forming the holes 25 may have a blunt tip that is heated, for example to 280° F. to form the holes and to seal and reinforce the perimeters of the holes against tearing. The formation of a slit may be accomplished using a pin that has a chisel-like tip or a knife to form a slit of rectangular shape.

The provision of holes 25 or slits in a web of membrane material facilitates the pneumatic filling of the resulting sleeve with aggregate since the holes 25 or slits allow the passage of air.

The holes 25 or slits in the sleeve of membrane material 14 being placed at the bottom of a drainage element 10 allows soil, stones and the like that infiltrate into the drainage element to be passed through the bottom of the drainage element without accumulating within the drainage element. This avoids clogging of the drainage element in use over time, particularly with septic effluent when used in aseptic system. The size of the holes 25 are made to accommodate the passage of infiltrating debris, such as dirt and stones while, retaining the aggregate in place. To this end, the holes 25 in each row are of ½ inch diameter and located on 1 inch centers within an 18 inch section of the sleeve 11. Alternatively, the holes may be of any other suitable size and spacing, such as ¼ inch holes on ½ inch centers, and ⅛ inch holes on ¼ inch centers.

The rows of holes or slits are spaced apart from each other in like manner or may be staggered relative to each other. Further, the pattern of holes 25 or slits may be grouped in a plurality of rows that are longitudinally spaced apart from other grouping of holes or slits.

The apparatus for forming the sleeve 11 may be modified so that the seam that is made by the longitudinal ends of a web are in parallel upstanding relation relative to the remainder of the sleeve.

The invention thus provides a drainage element that is able to filter fine particles of solid material from effluent entering into the element and that prevents clogging of the discrete aggregate when in use. The drainage element may be used in a horizontal disposition, for example in a septic system, drainage system and landscaping system, or may be used in a vertical disposition or any disposition in between horizontal and vertical depending on the intended purpose of the drainage element.

Still further, the invention provides an improved method for making a drainage element with light weight aggregate that prevents soil and the like from passing into the aggregate.

What is claimed is:

1. A drainage element comprising
a mass of discrete aggregate defining passageways for a flow of fluid therethrough; and
a sleeve encasing said mass of discrete aggregate, said sleeve including a first peripheral portion of less than 360° including a membrane material and a net material laminated together to form an integral two-ply layer and a second peripheral portion of less than 360° of net material having openings for retaining said aggregate and allowing the passage of water, said net material being seamed together at longitudinal edges thereof.

2. A drainage element as set forth in claim 1 wherein said membrane is a water-permeable filter material having a plurality of interstices characterized in being of a size for the passage of water therethrough and the filtering of fine particles of solid material from water passing through said membrane.

3. A drainage element as set forth in claim 1 wherein said membrane is a web of paper.

4. A drainage element as set forth in claim 1 wherein said membrane is a web of plastic film.

5. A drainage element comprising
a mass of discrete aggregate defining passageways for a flow of fluid therethrough;
a sleeve encasing said mass of discrete aggregate, said sleeve including a first peripheral portion including a membrane material and a net material laminated together to form an integral two-ply layer and a second peripheral portion of net material having openings for retaining said aggregate and allowing the passage of water and a pair of longitudinal edges secured together,
at least one strip of netting of finer mesh than said netting disposed in overlapping relation to said pair of longitudinal edges, and
an adhesive bonding said strip of netting and said pair of longitudinal edges together to form a seam.

6. A drainage element as set forth in claim 1 wherein said second peripheral portion of laminated membrane material and a net material extends longitudinally and over at least 45% of the periphery of the drainage element.

7. A drainage element comprising
a mass of discrete aggregate defining passageways for a flow of fluid therethrough; and
a sleeve of water-permeable filter material encasing said mass of discrete aggregate, said sleeve having a longitudinally extending pattern of holes in a peripheral portion thereof, said peripheral portion constituting less than 50% of the total periphery of said sleeve.

8. A drainage element as set forth in claim 7 wherein said pattern of holes constitute less than 45% of the total periphery of said sleeve and are disposed on a spacing of one inch on centers.

9. A drainage element comprising
a mass of discrete aggregate defining passageways for a flow of fluid therethrough;
a web of net material having two longitudinal edges secured together to define a sleeve encasing said mass of discrete aggregate and having openings for retaining said aggregate and allowing the passage of water; and
a web of membrane material centrally located relative to and laminated to said web of net material to form an integral two-ply layer in a first peripheral portion of said sleeve.

10. A drainage element as set forth in claim 9 wherein said membrane is a water-permeable filter material having a plurality of interstices characterized in being of a size for the passage of water therethrough and the filtering of fine particles of solid material from water passing through said membrane.

11. A drainage element comprising
a mass of discrete aggregate defining passageways for a flow of fluid therethrough; and
a sleeve encasing said mass of discrete aggregate and having a first peripheral portion of a two-ply laminated construction formed of a longitudinal web of a membrane material and a longitudinal web of net material, said net material being of wider width than said web of membrane material and seamed together at longitudinal edges thereof, and a remaining second peripheral portion of single ply construction formed of said web of net material, said web of net material having openings for retaining said aggregate and allowing the passage of water.

* * * * *